United States Patent [19]

Heberger et al.

[11] Patent Number: 4,775,593

[45] Date of Patent: Oct. 4, 1988

[54] FLEXIBLE MAGNETIC RECORDING MEDIA HAVING SUPERIOR PEEL STRENGTH

[75] Inventors: John M. Heberger, Greer; Russell S. Foxhall, Lyman, both of S.C.

[73] Assignee: Hoechst Celanese Corporation, Somerville, N.J.

[21] Appl. No.: 59,995

[22] Filed: Jun. 9, 1987

[51] Int. Cl.$^4$ .................... G11B 5/702; G11B 5/704
[52] U.S. Cl. .................... 428/411.1; 427/39; 427/128; 427/129; 427/130; 427/131; 428/425.9; 428/480; 428/694; 428/900; 428/910
[58] Field of Search ............ 427/131, 130, 129, 128, 427/39, 132; 428/695, 694, 340, 425.9, 411.1, 480, 910, 330; 360/134-136

[56] References Cited

U.S. PATENT DOCUMENTS

| | | | |
|---|---|---|---|
| 3,215,554 | 11/1965 | Loots | 428/510 |
| 3,387,995 | 6/1968 | Senkpiel | 428/900 |
| 3,512,930 | 5/1970 | Bottjer | 427/128 |
| 4,183,976 | 1/1980 | Yamada | 427/130 |
| 4,210,703 | 7/1980 | Scantlin | 428/900 |
| 4,214,035 | 7/1980 | Herberger | 427/40 |
| 4,428,974 | 1/1984 | Okita | 427/130 |
| 4,439,479 | 3/1984 | Kanai | 428/692 |
| 4,486,483 | 12/1984 | Caines | 428/341 |
| 4,525,424 | 6/1985 | Bradshaw | 427/128 |
| 4,666,769 | 5/1987 | Miyata | 428/323 |

OTHER PUBLICATIONS

Charles M. Hansen; "The Three Dimensional Solubility Parameter—Key to Paint Component Affinities: I. Solvents, Plasticizers, Polymers, and Resins", Journal of Paint Technology, vol. 80, #505, Feb. 1967; pp. 104–117.

Primary Examiner—Ellis P. Robinson
Attorney, Agent, or Firm—Gregory N. Clements

[57] ABSTRACT

A flexible magnetic recording media having superior peel strength is disclosed. The magnetic recording media comprises a primer coated polyester film which has been overcoated with a coating comprising ferromagnetic particles dispersed in a polymeric binder. The primer coating is preferably sodium oleate which has been in-line coated onto polyethylene terephthalate film. The ferromagnetic particles are preferably chromium dioxide particles. The polymeric binder is preferably a polyurethane reaction product of (A) a hydrolytically stable difunctional alcohol, (B) a chain extender, and (C) an aromatic diisocyanate.

26 Claims, No Drawings

FLEXIBLE MAGNETIC RECORDING MEDIA HAVING SUPERIOR PEEL STRENGTH

BACKGROUND OF THE INVENTION

This invention relates to flexible magnetic recording media which comprise a polyester substrate which has been coated with a magnetizable layer. More particularly, the present invention relates to a polyester film which has been coated with an adhesion-promoting primer layer prior to being coated with a coating composition comprising ferromagnetic particles dispersed within a polymeric binder.

Flexible magnetic recording media, such as audio, video, and computer tape, is typically manufactured by coating biaxially oriented polyester film with a solution of ferromagnetic particles, such as iron oxide or chromium oxide particles, and a polyurethane binder prepolymer which has been dissolved in a strong solvent such as tetrahydrofuran, methylethylketone, methylisobutylketone, or cyclohexanone. A strong solvent is typically used in order to render the polyester surface more receptive to the ferromagnetic coating. The solvent is typically removed during drying of the polyurethane pre-polymer.

The binders typically employed to manufacture flexible magnetic recording media, commonly referred to as "magnetic tape", are polyurethanes, polyvinyls, and polyurethane/polyvinyl graft copolymers. Other polymeric additives may be included to achieve the optimum hardness, flexibility and adhesion. In addition, lubricants, dispersants, and curing agents are typically included in the coating formulation.

Magnetic tape must possess exacting physical, chemical and magnetic properties. Physical requirements include an acceptable coefficient of friction, high modulus of elasticity and tensile strength, and good abrasion resistance. The polymeric binder must be adherent to the polyester substrate, be chemically compatible with the ferromagnetic particles, and exhibit long-term stability. Finally, the magnetic tape must have a high data storage capacity.

In recent years magnetic tape manufacturers have sought to increase the information density and overall quality of flexible magnetic recording media in order to accommodate recent improvements in recording format technology such as perpendicular recording, digital recording and decreasing track width. Manufacturers have demanded improvements in polyester substrates, particularly thinner films with enhanced mechanical properties, smoother surfaces and better adhesion to the ferromagnetic coating. The industry has also sought to develop thinner, smoother ferromagnetic coatings which incorporate smaller particles and which possess higher coercivity.

As part of this development effort, the American National Standard Institute ("ANSI") has issued a proposed American National Standard for coating adhesion to the tape substrate (ANSI Project #488, Third Draft, April 19, 1985). The proposed standard requires that the force required to peel a ferromagnetic coating from the tape substrate be greater or equal to 0.12N/mm (0.69 lbs/inch) of tape width. Although at least one magnetic tape manufacturer has produced magnetic tape which exhibits a peel strength greater than 0.69 lbs/inch, several commercially available magnetic tapes cannot meet this proposed ANSI standard.

One approach to ehhance adhesion is to subject the film surface to an electric corona discharge treatment prior to coating the film with the ferromagnetic coating. This approach is not favored due to the fire and explosion hazards associated with the use of high voltage electrical equipment in the presence of volatile organic solvents such as those employed in the production of flexible magnetic recording media.

Another approach has been to interpose an adhesive or primer layer between the polyester film and the ferromagnetic coating. For example, U.S. Pat. No. 3,215,554 discloses vinylidene chloride/acrylonitrile copolymers as a primer layer, while U.S. Pat. No. 3,387,995 suggests a polycondensate of terephthalic acid, isophthalic acid and ethylene glycol. U.S. Pat. No. 3,661,874 teaches the use of an aminized reaction product of an epoxidized polybutadiene will enhance adhesion. Finally, U.S. Pat. No. 4,210,703 discloses a cationically polymerized epoxy resin which improves adhesion and also prevents extraction of low molecular weight oligomers from the polyester substrate by the strong solvents employed in magnetic tape manufacture.

BRIEF SUMMARY OF THE INVENTION

The present invention relates to a flexible magnetic recording media which exhibits superior peel strength and which comprises (i) an oriented polyester film;
(ii) a primer coating on at least one side of said film consisting essentially of a water-soluble alkali metal salt of an unsaturated fatty acid having from 10 to 18 carbon atoms;
(iii) a ferromagnetic coating applied over said primer coating, said ferromagnetic coating comprising ferromagnetic particles dispersed in a polymeric binder;

said primer coating being present at a weight effective to improve the adhesion of said ferromagnetic coating to said film.

In a preferred embodiment, the present invention relates to a high density computer tape having superior peel strength which comprises (i) biaxially oriented polyethylene terephthalate film;
(ii) a primer coating on at least one side of said film consisting essentially of a water-soluble salt of oleic acid;
(iii) a ferromagnetic coating applied over said primer coating, said ferromagnetic coating comprising chromium dioxide particles dispersed in a thermoplastic polyurethane/polyester binder which is a reaction product of (A) a hydroxyl-terminated polyester which itself is a reaction product of a hydrolytically stable difunctional alcohol, (B) a chain extender, and (C) an aromatic diisocyanate such that the proportions of (A), (B) and (C) are selected to produce a polyester/polyurethane having a polyurethane content in the range of 37 to 40 percent by weight, of a molecular weight above 60,000 with the polyester segment molecular weight being in the range of about 500 to 1500.

In yet another aspect, the present invention relates to a magnetic recording media which is produced by the process comprising (i) extruding a substantially amorphous polyester resin in sheet-like form and subsequently cooling said resin to form cast polyester sheet, (ii) subsequently orienting said polyester sheet in the longitudinal direction, thereby forming monoaxially oriented polyester film,
(iii) coating said sheet with an aqueous solution consisting essentially of a water-soluble alkali metal salt of an unsaturated fatty acid having from 10 to 18 carbon atoms;
(iv) subsequently orienting said monoaxially oriented polyester film in the tranverse direction thereby forming biaxially oriented polyester film,
(v) heatsetting said biaxially oriented polyester film,
(vi) subsequently overcoating said polyester film with ferromagnetic coating composition comprising
  (a) a solvent selected from the group consisting of tetrahydrofuran, methylethylketone, methylisobutylketone, and cyclohexanone,
  (b) ferromagnetic particles,
  (c) a pre-polymer,
(vii) curing said pre-polymer to produce a ferromagnetic coating comprising ferromagnetic particles dispersed in a polymeric binder.

DETAILED DESCRIPTION OF THE INVENTION

The preferred oriented polyester film for the purposes of this invention is made from polyethylene terephthalate, although the invention is equally applicable to film prepared from a crystallizable polyester resulting from the polycondensation of a glycol such as ethylene glycol or butanediol and mixtures thereof with terephthalic acid or mixtures of terephthalic acid and other dicarboxylic acids such as isophthalic acid, diphenic acid and sebacic acid, or their polyester forming equivalents. The polyester preferably contains non-ferromagnetic inorganic particles which improve the processibility of films made from such resin. Such polyesters may be conveniently prepared as disclosed in U.S. Pat. Nos. 3,821,156 and 3,884,870. The film may be produced by conventional techniques using well known apparatus.

For example, the particle-filled polyester is melted and extruded as an amorphous sheet onto a polished revolving casting drum to form a cast sheet of polymer. Thereafter, the film is axially stretched in one direction, either in the direction of extrusion ("machine direction") or perpendicular to the direction of extrusion ("transverse direction") in the case of monoaxially oriented film. Biaxially oriented film is stretched in both the longitudinal and transverse directions. The first stretching step of the cast sheet may be in either of these two orthogonal directions. The amount of stretching employed to impart strength and toughness to the film can range from about 3.0 to about 5.0 times the original cast sheet dimension in one or both directions. Preferably, the amount of stretching is in the range of from about 3.2 to 4.2 times the original dimension of the cast polyester sheet. The stretching operations are performed at temperatures in the range of from about the second order transition temperature to below the temperature at which the polymer softens and melts.

Where desired, the film is heat treated, after stretching, for a period of time necessary to crystallize the polyester film. Crystallization imparts stability and good tensile properties to the film. When polyethylene terephthalate is heat treated, it is subjected to a temperature in the range of between about 190° C. and 240° C. and, more preferably, in the range from about and 235° C.

The alkali metal salt primer coating of this invention may be applied as an aqueous solution in-line at one of three stages during the film manufacture: the pre-draw stage at the point between the casting of the amorphous sheet and the first stretch such as disclosed, for example, in British Pat. No. 1,411,564; the inter-draw stage subsequent to the uniaxial drawing but prior to biaxial stretching such as disclosed, for example, in U.S. Pat. No. 4,214,035; or the post draw stage subsequent to biaxial stretching, but prior to winding the film. Normally, the heat applied to the film prior to or during the stretching or final conditioning stages is sufficient to evaporate the water and other volatiles and thereby dry the primer coating, although a separate drying step would be required if the coating were applied subsequent to such heating steps.

In one preferred embodiment, the primer coating is applied after the film is uniaxially stretched, that is, after the film is stretched in one direction, but before the film is stretched in the orthogonal direction. In a still more preferred embodiment, the polyester film is first stretched in the longitudinal direction prior to coating. In this preferred embodiment, after longitudinal stretching, the film is coated by any of the well known techniques employed in the art. For example, coating may be performed by roller coating, spray coating, slot coating or immersion coating. In a preferred embodiment, the polyester film is coated by means of gravure roller coating. Also, the uniaxially drawn film may be subjected to an electric corona discharge by a corona discharge apparatus prior to coating as is disclosed in U.S. Pat. Nos. 3,520,959; 3,820,929; and 4,028,032. The corona discharge treatment decreases the hydrophobic character of the polyester film surface, which permits the aqueous coating to more easily wet the surface and thus improve the adhesion of the primer coating to the polyester film surface.

As indicated above, water-soluble alkali metal salts of unsaturated fatty acids having from about 10 to 18 carbon atoms are effective as adhesion promoting primer layers for PET film. By the term "water soluble" it is meant that the salts should be soluble in ordinary tap water at room temperature at concentrations of at least 0.4 g. per 100 cc water, more preferably at concentration in excess of 2.0 g. per 100 cc of water. Suitable water-soluble salts include the sodium or potassium salts of oleic, palmitoleic, ricinoleic and petroselinic acids. Sodium oleate and potassium oleate are preferred.

The salts used as PET primer coatings must also exhibit relative heat stability at temperatures in excess of 200° C. which are typically encountered during the drying and heat setting of oriented polyester film. Because of high heat stability, good water solubility and commercial availability, sodium oleate (sodium salt of cis-9-octadecenoic acid) is the preferred water soluble salt for the purposes of this invention.

As indicated above, the primer coating of the present invention is applied to the base polyester film as an aqueous solution and at a solids concentration within the range of about 0.2 to 15% by weight, preferably about 0.3 to 6% by weight. The preferred solids level is such as to yield a final dry coating weight of about $1 \times 10^{-8}$ to $2 \times 10^{-5}$ lbs. per square foot of film surface. Preferably, the range is from about $2 \times 10^{-7}$ to $7 \times 10^{-6}$ lbs per square foot, with $9.6 \times 10^{-7}$ lbs. per square foot being the target weight.

The coating of this invention may be applied to one or both sides of the film, or it may be applied to one side and a different coating such as a thermosetting acrylic or methacrylic applied to the opposite side, such as taught in U.S. Pat. No. 4,214,035. The coating may also in some cases be applied over a different primer coating to which it will adhere and which is already present on the surface of the film, such as a thermosetting acrylic coating as described in U.S. Pat. No. 3,819,773.

The aqueous solution consists essentially of the above defined acid salt and does not include other ingredients which would detract from the adhesion promoting characteristics thereof, such as particulate material, or polymeric ingredients in which the salt might be present in minor amounts as an emulsifier or dispersing agent. The term "consisting essentially of" is not intended however to exclude the presence of minor amounts of other water soluble ingredients such as water soluble dyes, pH regulating agents, and the like. Preferably, the aqueous solution consists of water (de-ionized or tap) and from about greater than 0.2% to about 10% by weight of one or more of the above defined acid salts.

The primer coated polyester film which forms a part of the present invention is disclosed in R. Caines, "Polyester Film Primed With Organic Acid Salts," U.S. Pat. No. 4,486,483, the disclosure of which is hereby incorporated by reference in its entirety.

As summarized above, a ferromagnetic coating composition is applied over the primer coated polyester film to produce the flexible magnetic recording media of the present invention. The ferromagnetic coating composition comprises ferromagnetic particles and a prepolymer dissolved in a strong solvent such as tetrahydrofuran, methylethylketone, methylisobutylketone or cyclohexanone. Mixtures of tetrahydrofuran and cyclohexanone are preferred.

The ferromagnetic particles may be any of the magnetic particles typically employed to produce ferromagnetic coatings. Such particles include acicular $\gamma$-$Fe_2O_3$, acicular $\gamma$-$Fe_2O_3$ which has either been doped or adsorbed with cobalt, chromium dioxide, and barium ferrite ($BaO \cdot 6Fe_2O_3$).

The practice of the preferred embodiment requires the use of ferromagnetic chromium dioxide particles dispersed in the polymeric binder. The chromium dioxide particles may be either stabilized or unstabilized against the effects of reductive degradation, as caused, for example, by the presence of water and certain easily oxidizable functional groups, such as hydroxyl or amine. Stabilized particles, such as those disclosed in U.S. Pat. Nos. 3,512,930 and 3,529,930, are preferred.

Generally, magnetic tape manufacturers desire chromium dioxide loadings as high as possible to maximize magnetic performance. However, an excessive amount of chromium dioxide may result in a low abrasion resistance and "oxide shed" whereby the ferromagnetic particles are abraded from the magnetic tape onto the surfaces of the tape handling equipment. Oxide shed will result in a high error rate and also foul the tape handling equipment.

The ferromagnetic coating of the present invention may contain from 70 to 90 weight percent of chromium dioxide particles, preferably from 80 to 90 weight percent. When the preferred polyurethane binder is employed the optimum chromium dioxide loading is about 84 percent.

Any conventional binder system which is typically employed in flexible magnetic recording media to anchor the ferromagnetic particles to the polyester substrate may be employed in the present invention. As stated above, commercial binder systems generally comprise polyurethanes, polyvinyls, and blends or copolymers of polyurethanes and polyvinyls.

Polyester-polyurethanes (a type of thermoplastic elastomer) are widely used as binders for flexible magnetic recording media. These materials are composed of segments or blocks of chemically different units. The relatively soft polyester segment is composed of a repeating series of ester-linked units, and is itself a short-chain-length polymer. The polyester segments are formed by the reaction of a difunctional carboxylic acid with difunctional alcohol, such that the ester is terminated substantially with alcohol groups. The polyester segment typically has a molecular weight of from 500 to 4000, corresponding to chains composed of from four or five ester units, to as many as twenty. The effect of an increase in the length of the relatively soft polyester segment is generally an increase in the elasticity of the binder. In general, it is the polyester portion of the polyester-polyurethane that determines the low temperature and the elastomeric properties of the polymeric binder.

The other component in the polyester-polyurethane binder is the relatively hard polyurethane segment. This portion possesses a markedly different chemical and mechanical behavior from that exhibited by the relatively soft polyester segments. In general, the polyurethane segment is a hard, rigid polymer with a melting point near 200° C. The polyurethane is usually prepared from a difunctional aromatic diisocyanate, such as 4,4'-diphenylmethane diisocyanate (MDI), which is reacted with a difunctional alcohol, such as 1,4-butanediol. The polyurethane usually has a very short chain length in the case of polyester-polyurethane elastomers used in solvent-based magnetic media coatings, because the polyurethane is not particularly soluble in the solvents commonly used in the manufacture of magnetic-tape coatings, such as tetrahydrofuran and methylisobutylketone. In addition, increasing the size of the polyurethane segments has been found to increase hardness, modulus, and flow temperature, at the expense of elasticity and toughness. For flexible magnetic recording tape, a balance of properties is sought so that the binder can be adapted to the requirements of magnetic recording.

A preferred polyester/polyurethane binder is disclosed in R. Bradshaw, "Flexible Magnetic Recording Media Having A Polyester Polyurethane Binder And Chromium Dioxide Pigment," U.S. Pat. No. 4,525,424 (June 25, 1985) the disclosure of which is expressly incorporated herein by reference. This patent discloses a polyurethane binder which is a reaction product of (A) a hydroxyl-terminated polyester, which itself is a reaction product of a hydrolytically stable difunctional alcohol, preferably 1,4-cyclohexanedimethanol, and a dicarboxylic acid selected from the group consisting of adipic, azelaic and 1,12-dodecanedioic acid, and preferably a mixture thereof, such that the polyester exhibits a hydroxyl number of about 50 to about 250;

(B) a diol chain extender (selected from the group consisting of 1,4-butanediol; 1,3-butanediol; 1,5-pentanediol; 1,6-hexanediol; and 2,5-hexanediol, and preferably mixtures of 1,4-butanediol and 1,6-hexanediol), in order that the hydroxyl number of the polyester and the chain extender together is about 130 to about 300; and (C) an aromatic diisocyanate such as 4,4'-diphenylmethane diisocyanate.

In addition, the constituents (A), (B) and (C) must be employed in a proportion to yield a polyurethane having a polyurethane segment content in the range of about 37 to 40 percent by weight.

Further, it is preferred that the molecular weight of the polyurethane be above 60,000; and that the molecular weight of the polyurethane's polyester segment be in the range of about 500 to 1500. If the molecular weight of the relatively soft polyester segment is much lower than 500, the chromium dioxide-filled coating will become too hard, and manufacturing processes may become difficult. If the molecular weight of the polyester segment is much higher than 1500, the coating may become too soft, and topographic changes, leading to smoothing, tends to occur. This has been found to degrade the frictional performance of the tape. The diol chain extender (B) improves the flexibility of the relatively hard polyurethane segment. In addition, the diol chain extender permits loading the binder with a high concentration of chromium dioxide particles without a prohibitive increase in brittleness.

The ferromagnetic coating composition may be applied to the primer coated polyester film by any of the conventional techniques employed in the art. The chromium dioxide particles are then oriented by subjecting the film to a magnetic field. The film is then dried to remove the strong solvent and subsequently calendered to produce a smooth coating surface. The calendering operation does not affect the magnetic orientation of the chromium dioxide particles. The pre-polymer is then cured, and the film is slit to the desired width, burnished, and cleaned. The flexible magnetic recording tape produced thereby may be wound upon a reel or loaded into a cartridge for ultimate use in computer equipment.

The polymeric binder may optionally include additives commonly employed in ferromagnetic coating compositions, such as dispersing agents, lubricants, antistatic agents, and fungicides. U.S. Pat. No. 3,649,541 contains an exemplary discussion of lubricants suitable for use in chromium dioxide-based ferromagnetic coatings.

The flexible magnetic recording media of the present invention may be optionally coated on its opposite surface with a "backcoat" to improve the mechanical performance of the media. Such backcoats may comprise the same binder system as the ferromagnetic coating, with a conductive, non-ferromagnetic particle, such as carbon black, in place of the chromium dioxide.

The peel strength adhesion of a given magnetic tape will depend upon a variety of factors including (a) whether an adhesion promoting coating has been applied to the tape substrate prior to coating it with the ferromagnetic coating, (b) the specific polymeric binder employed, (c) the degree of cure, (d) ferromagnetic coating thickness, (e) chromium dioxide particle/binder ratio and (f) solvent effects. Within a given binder system, the degree of cure is the most critical factor affecting adhesion. If the ferromagnetic coating composition is excessively crosslinked the binder becomes brittle and adhesion is poor. If the degree of cure is too low, the binder fails cohesively and may exhibit an unacceptably high coefficient of friction.

The Applicants believe that the primer coating of this invention will substantially improve the peel strength adhesion of a given magnetic tape, assuming that all other variables are held constant.

EXAMPLES

The following Examples illustrate the practice and advantages of specific embodiments of the present invention. In no event should these specie embodiments of the generic invention be construed as limiting the scope of the claims.

EXAMPLE I

Preparation of Flexible Recording Media Having a Primer Coated Polyester Film Substrate Polyethylene terephthalate polymer containing silicon dioxide and calcium carbonate particles, as disclosed in U.S. Pat. No. 3,821,156 was melted and extruded through a slot die onto a casting drum maintained at a temperature of about 25° C. The melt froze to form a cast sheet. The cast sheet was longitudinally stretched at a draw ratio of approximately 3.5:1 while being maintained at a temperature of about 80° C.

The longitudinally drawn film was corona treated in conventional manner and subsequently coated with an aqueous solution containing 0.75% by weight of dissolved sodium oleate by reverse gravure coating with a nominal wet coating weight of 0.5 wet lbs./1000 ft² of forward drawn sheet.

The corona treated, logitudinally drawn, coated film was dried at a temperature of about 100° C. Thereafter, the film was stretched in the transverse direction at a draw ratio of 3.9:1 to produce a biaxially drawn film. The biaxially drawn film was heat set at a maximum temperature of 230° C., and wound into the form of a roll or cylinder. The nominal dry weight of the coating was $9.6 \times 10^{-7}$ lbs. per square foot of film. The thickness of the base PET film was about 0.00092 inches.

Several rolls of the primer-coated, particle-filled polyester film produced according to the method illustrated above were sent to a magnetic tape manufacturer. The tape manufacturer coated over the primer-coated polyester film with a ferromagnetic coating comprising chromium dioxide particles dispersed within a polymeric binder believed to be the preferred polyester-polyurethane described above. 541 foot lengths of the magnetic tape so prepared was loaded into tape cartridges designed for use with the IBM 3480 tape handling system. Thirty such "3480 tape cartridges" were returned to the Applicants for evaluation.

EXAMPLE II

Peel Strength Evaluation of Flexible Magnetic Recording Media

Two of the "3480 tape cartridges" received from the magnetic tape manufacturer were opened and the flexible recording media (ie. magnetic tape) housed therein was removed. Fifteen inch samples of each tape were measured and cut.

The peel strength of the magnetic tape was evaluated by scribing a line through the ferromagnetic coating of each tape sample and attaching one end of the 15 inch long samples to a smooth metal plate by means of a two-side-coated adhesive tape equivalent to Permacel P-941 between the tape and the metal plate. The free end of the sample tape and the metal/tape laminate were each clamped to the opposing jaws of an Instron Model TM-4 tester with an initial jaw separation of 10 inches, such that as the jaws were separated the tape was peeled from the plate at an angle of 180° beginning at the scribe line. The jaw separation rate was set at a nominal 10 inch/minute. The average force required to peel the tape from the pressure-sensitive adhesive tape is reported in Table I.

TABLE I

PEEL STRENGTH VALUES OF PRIMER COATED POLYESTER TAPES

| Sample No. | Peel Strength (lb/in) |
| --- | --- |
| Sample 1 | 0.84 |
| Sample 2 | 0.98 |

The peel strength values reported in TABLE I above exceed the proposed ANSI standard of 0.69 lbs/inch. The tape manufacturer who coated the Applicants' primed polyester film reported that magnetic tape manufactured using an unprimed polyester film sample exhibited a peel strength of 0.30 lbs/inch, well below the ANSI standard.

We claim:

1. A magnetic recording media having superior peel strength comprising
   (i) an oriented polyester film,
   (ii) a primer coating on at least one side of said film consisting essentially of a water-soluble alkali metal salt of an unsaturated fatty acid having from 10 to 18 carbon atoms,
   (iii) a ferromagnetic coating applied over said primer coating, said ferromagnetic coating comprising ferromagnetic particles dispersed in a polymeric binder;
   said primer coating being present at a weight effective to improve the adhesion of said ferromagnetic coating to said film.

2. The magnetic recording media of claim 1 wherein said ferromagnetic particles are selected from the group consisting of ferric oxide, chromium dioxide, and barium ferrite.

3. The magentic recording media of claim 2 wherein said ferromagnetic particles comprise ferric oxide.

4. The magnetic recording media of claim 3 wherein said ferric oxide particles additionally have cobalt adsorbed onto their surface.

5. The magnetic recording media of claim 2 wherein said ferromagnetic particles comprise chromium dioxide.

6. The magnetic recording media of claim 1 wherein said oriented polyester film is biaxially oriented polyethylene terephthalate film.

7. The magnetic recording media of claim 6 wherein said unsaturated fatty acid is selected from the group consisting of oleic, palmitoleic, ricinoleic, and petroselinic.

8. The magnetic recording media of claim 7 wherein said unsaturated fatty acid is oleic acid.

9. The magnetic recording media of claim 8 wherein said primer coating consists essentially of sodium oleate.

10. The magnetic recording media of claim 6 wherein said polymeric binder comprises a polyurethane-/polyester block copolymer.

11. The magnetic recording media of claim 10 wherein said polyurethane/polyester block copolymer is the reaction product of
    (A) a hydroxyl-terminated polyester, which itself is a reaction product of a difunctional alcohol having hydrolytic stability, and a dicarboxylic acid selected from the group consisting of adipic acid, azelaic acid, 1,12-dodecanedioic acid, and mixtures thereof, said polyester having a hydroxyl number of about 50 to 250;
    (B) a chain extender comprising a primary or a secondary alcohol selected from the group consisting of 1,4-butanediol; 1,3-butanediol; 1,5-pentanediol; 1,6-hexandiol; and 2,5-hexandiol, the resultant hydroxyl number of said polyester and chain extender being about 130 to 300; and
    (C) an aromatic diisocyanate;
    wherein the relative proportions of (A), (B) and (C) are selected to produce a ferromagnetic coating having a polyurethane segment content in the range of about 37 to 40 percent by weight, and a polyester segment molecular weight in the range of about 500 to 1500, wherein said ferromagnetic particles comprise chromium dioxide particles, and wherein said particles are present in the range of from 80 to 88% by weight of said ferrmmagnetic coating.

12. The magnetic recording media of claim 11 wherein said difunctional alcohol is 1,4-cyclohexanedimethanol.

13. The magnetic recording media of claim 12 wherein said chain extender is 1,4-butanediol.

14. The magnetic recording media of claim 11 wherein said aromatic diisocyanate is 4,4-methylene-bis-(1,4-phenylene) diisocyanate.

15. The magnetic recording media of claim 11 further having a backcoat layer comprising non-ferromagnetic particles dispersed in a polymeric binder.

16. A magnetic recording media produced by the process comprising
    (i) extruding a substantially amorphous polyester resin in sheet-like form and subsequently cooling said resin to form cast polyester sheet,
    (ii) subsequently orienting said polyester sheet in the longitudinal direction, thereby forming monoaxially oriented polyester film,
    (iii) coating said sheet with an aqueous solution consisting essentially of a water-soluble alkali metal salt of an unsaturated fatty acid having from 10 to 18 carbon atoms;
    (iv) subsequently orienting said monoaxially oriented polyester film in the transverse direction, thereby forming biaxially oriented polyester film,
    (v) heatsetting said biaxially oriented polyester film,
    (vi) subsequently overcoating said polyester film with a ferromagnetic coating composition comprising
        (a) a solvent selected from the group consisting of tetrahydrofuran, methylethylketone, methylisobutylketone, and cyclohexanone,
        (b) ferromagnetic particles,
        (c) a pre-polymer,
    (vii) curing said pre-polymer to produce a coating comprising ferromagnetic particles dispersed in a polymeric binder.

17. The film of claim 16 wherein said film is subjected to a corona discharge treatment prior to the application of said aqueous solution.

18. The film of claim 17 wherein said oriented polyester film is biaxially oriented polyethylene terephthalate film.

19. The film of claim 18 wherein the primer coating produced by application of said aqueous solution is present at a weight within the range of about $1 \times 10^{-8}$ to $2 \times 10^{-5}$ lbs per square foot of film surface on a dry weight basis.

20. The film of claim 19 wherein said primer coating consists essentially of an alkali metal salt of oleic acid.

21. The film of claim 20 wherein said primer coating consists essentially of sodium oleate.

22. The magnetic recording media of claim 16 wherein said prepolymer comprises (A) a hydroxyl-terminated polyester which itself is a reaction product of a hydrolytically stable difunctional alcohol, (B) a chain extender, and (C) an aromatic diisocyanate.

23. The magnetic recording media of claim 22 wherein said difunctional alcohol is 1,4-cyclohexanedimethanol.

24. The magnetic recording media of claim 22 wherein said chain extender is 1,4-butanediol.

25. The magnetic recording media of claim 22 wherein said aromatic diisocyanate is 4,4-methylene-bis-(1,4-phenylene) diisocyanate.

26. A magnetic recording media produced by the process comprising
(i) extruding a substantially amorphous polyester resin in sheet-like form and subsequently cooling said resin to form cast polyester sheet,
(ii) coating said sheet with an aqueous solution consisting essentially of a water-soluble alkali metal salt of an unsaturated fatty acid having from 10 to 18 carbon atoms;
(iii) subsequently orienting said polyester sheet in the longitudinal direction, thereby forming monoaxially oriented polyester film,
(iv) subsequently orienting said monoaxially oriented polyester film in the transverse direction, thereby forming biaxially oriented polyester film,
(v) heatsetting said biaxially oriented polyester film,
(vi) subsequently overcoating said polyester film with a ferromagnetic coating composition comprising
(a) a solvent selected from the group consisting of tetrahydrofuran, methylethylketone, methylisobutylketone, and cyclohexanone,
(b) ferromagnetic particles,
(c) a pre-polymer,
(vii) curing said pre-polymer to produce a coating comprising ferromagnetic particles dispersed in a polymeric binder.

* * * * *